United States Patent [19]
Grosseau

[11] 3,707,810
[45] Jan. 2, 1973

[54] EXPANDIBLE HONING HEADS

[75] Inventor: Albert Grosseau, Chaville, France

[73] Assignee: S.A. Automobiles Citroen, Paris, France

[22] Filed: June 9, 1971

[21] Appl. No.: 151,204

[52] U.S. Cl. ................. 51/346, 51/34 R, 51/165.93
[51] Int. Cl. ..................... B24b 9/02, B24b 49/00
[58] Field of Search .......... 51/165.93, 34 R, 338–346

[56] References Cited

UNITED STATES PATENTS

| | | | |
|---|---|---|---|
| 2,821,049 | 1/1958 | Harris | 51/346 |
| 3,404,490 | 10/1968 | Estabrook | 51/338 |
| 3,458,961 | 8/1969 | Henry-Biabaud | 51/338 |
| 3,651,608 | 3/1972 | Morgan | 51/338 |

Primary Examiner—Othell M. Simpson
Attorney—Arnold Robinson

[57] ABSTRACT

A honing head is constructed with at least two honing members so that two co-axial bores, not necessarily of the same diameter can be honed simultaneously. A mechanism serves to expand the honing members simultaneously and in dependence upon the resistive torque detected by a detector. A pneumatic device including a nozzle connected in a circuit serves to detect when one of the honing members contacts the corresponding bore to be honed. This contact serves to increase by a predetermined value, depending on the particular honing member at which contact was detected, the value of the resistive torque.

7 Claims, 6 Drawing Figures

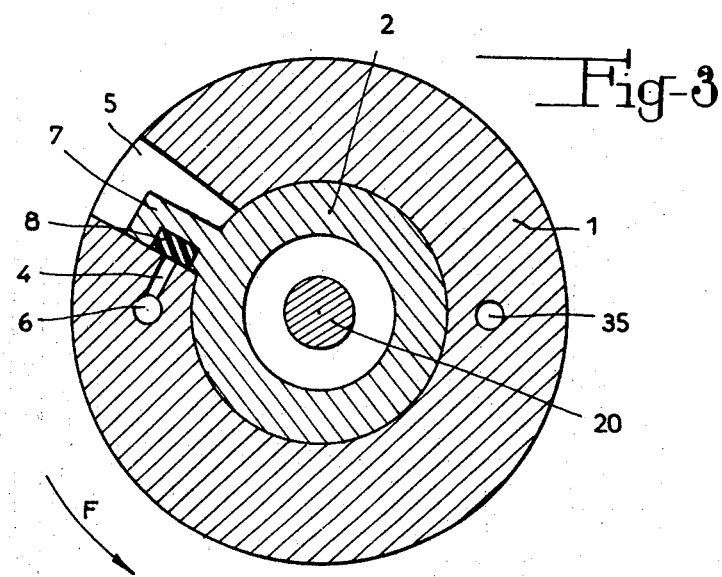
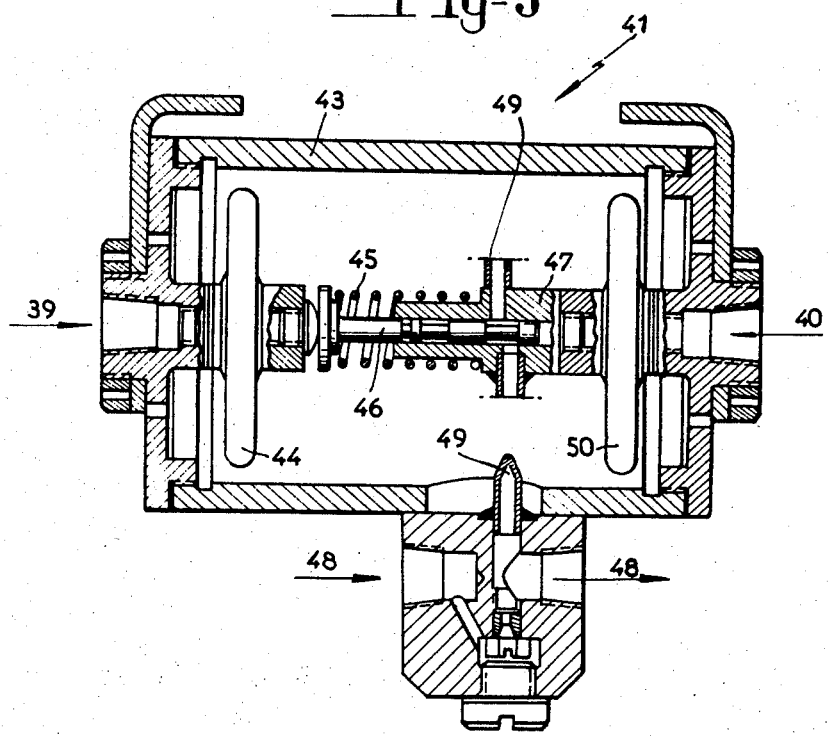

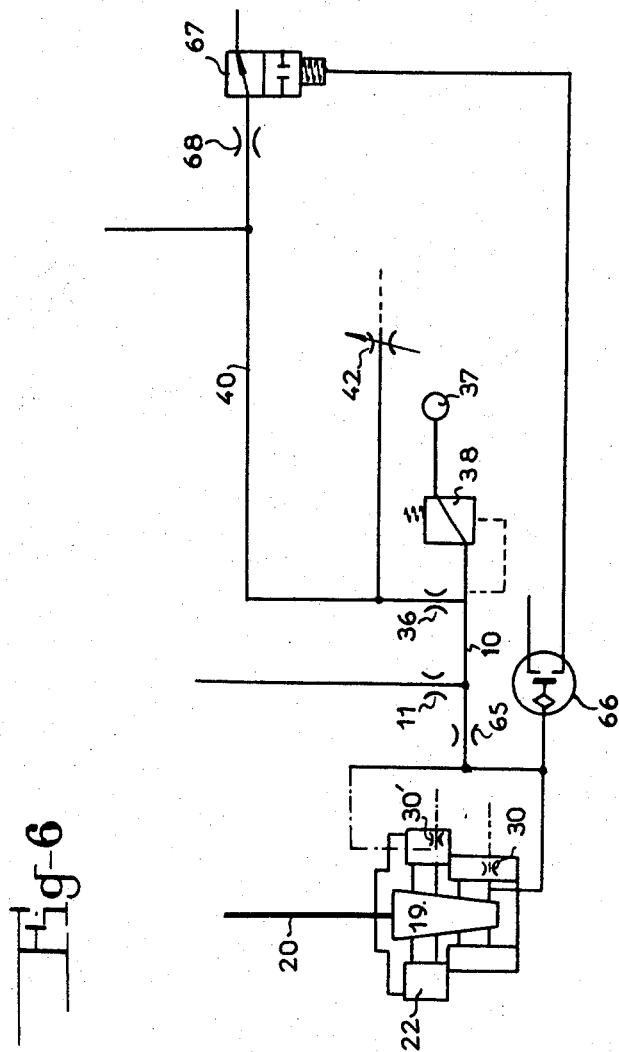

EXPANDIBLE HONING HEADS

BACKGROUND OF THE INVENTION

1. Field of the invention

This invention relates to expandible honing heads.

2. Description of the prior art

Honing machines have been proposed which incorporate at least two expandible members operated simultaneously by a single expanding mechanism, enabling at least two bores to be honed simultaneously in one and the same workpiece.

Other honing machines have been proposed in which the mechanism for expanding the honing members is controlled by a pneumatic device, which detects the resistive torque so as to maintain a constant applied torque on the tool.

The optimum applied torque is governed by the working face area of the tool and the diameter of the bore to be honed. In the case of a tool for simultaneously machining several concentric bores, it follows that the optimum torque is the sum of the torques for each of the bores; it therefore varies non-continuously, passing through known values but in a sequence that cannot be predicted because of the range of tolerances in the machining operations that preceded the honing. Hence, the mere addition of a resistive torque detector does not enable the optimum applied torque to be provided at any given moment.

An object of the present invention is to provide a honing head fitted with laps and incorporating at least two expandible honing members operated simultaneously by a single expanding mechanism, whereby the optimum applied torque can be provided at every stage of the honing operation, irrespective of the order in which the various bores are treated by the tool.

SUMMARY OF THE INVENTION

According to the present invention there is provided in a honing head at least two expandible honing members, mechanism for expanding the honing members simultaneously, a resistive torque detector, control means operative to actuate the said mechanism in dependence upon the resistive torque detected by the detector, a pneumatic device incorporated in one of the honing members and arranged to detect contact of the honing member with the corresponding bore, and means responsive to contact of the honing member whereby the resistive torque can be increased by a predetermined value depending on the particular honing member at which contact was detected.

With this head, if it be assumed that the grinding component has two honing members, for example, the torque is kept constant at an initial value when the honing member equipped with the contact detector is not yet in contact with its bore, and is then held constant at a higher value once contact has been made. The applied torque is thus adapted to the conditions at each stage of the work.

In the case of a honing head having only two honing members, it is possible for only one of these, preferably whichever has the higher optimum torque, to be fitted with a contact detector, but both honing members may equally well be provided with their own individual contact detector. In general terms, in the case of a honinghead incorporating more than two honing members, all of these, or only a certain number of them, may be equipped with individual contact detectors.

The contact detector may consist, for example, of a nozzle contained in the honing member and connected to a compressed air supply means through a flow regulator, the pressure beyond this regulator then provides an indication of whether contact has or has not been obtained.

In one particular embodiment the honing head includes a sequence or pilot valve inserted in the control circuit of the expanding mechanism, both the valve members (the body and the closing member) being movable, the movement being controlled in the case of the former by the value of the resistive torque detected and in the case of the latter by whether or not contact has been established.

The said body and closing member may each, for example, be fixed to the moving diaphragm of a capsule, one of the capsules being in communication with the torque detector and the other with the contact detector.

BRIEF DESCRIPTION OF THE DRAWINGS

An embodiment of a honing head in accordance with the invention will now be described, by way of example, with reference to the accompanying diagrammatic drawings, in which:

FIG. 3 is a cross-section of the spindle, taken along the line III—III of FIG. 2;

FIG. 5 is an axial section of a pilot valve forming a part of the circuits of FIG. 4; and FIG. 6 shows a modification of part of the circuits of FIG. 4.

DESCRIPTION OF THE PREFERRED EMBODIMENTS

Figure 1:
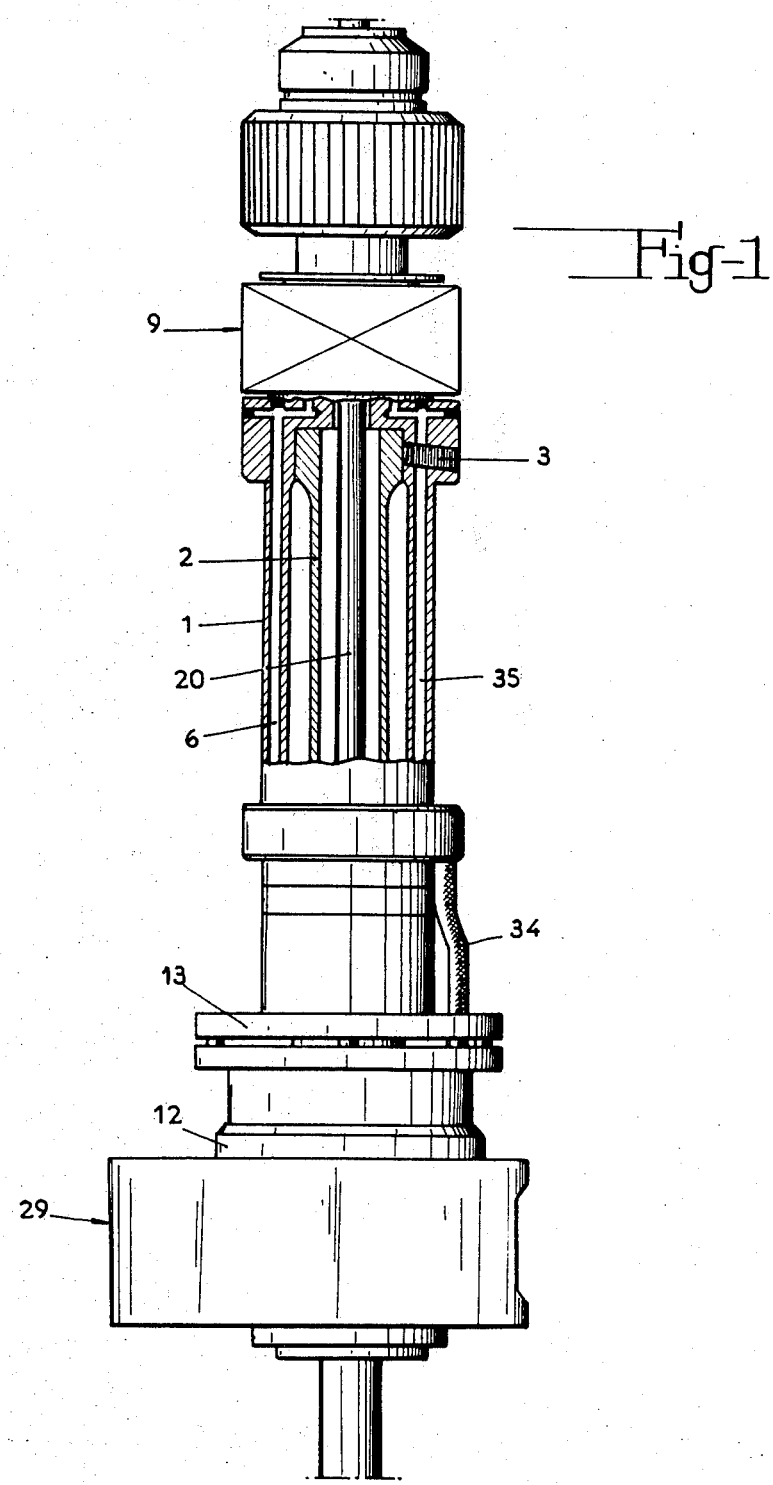
FIG. 1 is an elevation of a spindle of the head, partly in longitudinal section.
Figure 2:
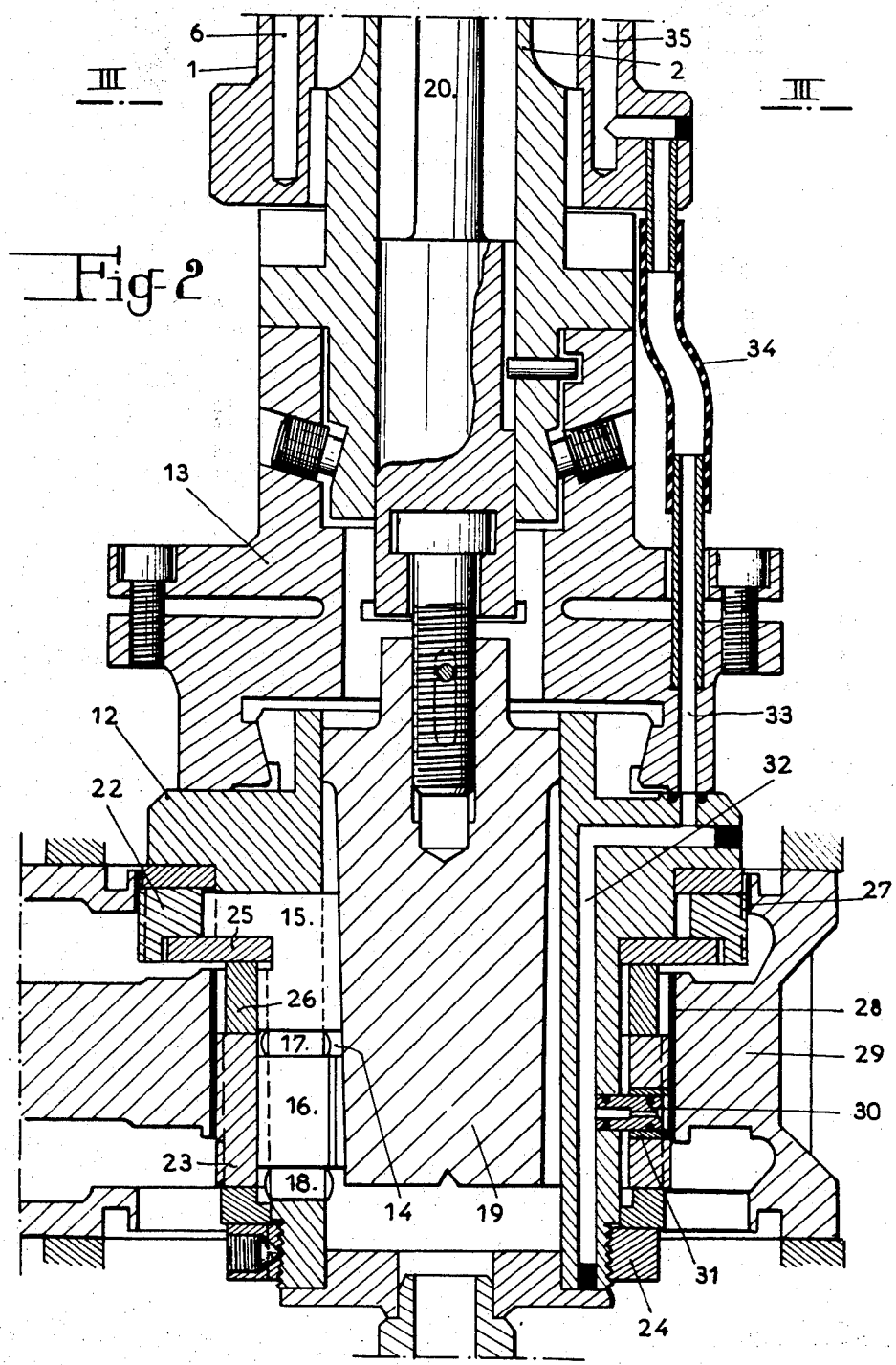
FIG. 2 is a longitudinal section, to an enlarged scale, of the lower part of the spindle equipped with the honing members.

The honing head includes a hollow spindle 1 rotatably mounted on a stand (not shown), which latter is itself movable, in relation to a stationary support, along the longitudinal center line of the spindle.

Provision is made, again by means not shown in the drawing, for imparting reciprocatory motion to the spindle mounting means and hence also to the spindle 1.

The hollow spindle 1 contains a tubular torsion member, 2, the upper end portion of which is secured to the spindle by screws 3. The lower end portion of the spindle 1 has a nozzle 4, in one of the side faces of a radial slot 5 in the spindle (FIG. 3) and communicating with a longitudinal passage 6 in the spindle itself. Abutting the nozzle exit is a closure member, for example, a lug 7, fitted with a seal 8, and forming part of the torsion member 2, the arrangement being such that the closure member closes the nozzle exit when in the position of rest. The passage 6 communicates through a rotary seal shown diagrammatically at 9 with a compressed air supply line 10 (FIG. 4), in which is inserted a flow regulator comprising, for example, an orifice 11.

The assembly just described constitutes a torque detector as disclosed in French Pat. specification No. 1,538,652, filed by the present applicant on the 28th July, 1967. When the spindle 1 is driven in the sense of the arrow F and the lower end of the torsion member 2 encounters resistive torque, the lower end turns, in relation to the lower end of the spindle 1, in a direction opposite of that of the arrow F, so that the closure member 7 moves away from the nozzle 4, through an angle proportional to the resistive torque. The mass flow of air escaping from the nozzle is therefore proportional to that torque; likewise the air pressure downstream of the orifice 11 falls as the resistive torque rises.

The honing member body 12 is fixed, by an auxiliary connector 13, to the lower end of the torsion member 2. Mounted in radial recesses 14 within the body 12 are two sets of slidable thrust members 15 and 16. Rollers 17 and 18, are interposed respectively between the thrust member 15 and the thrust member 16 and between the latter and the bottom of the recess 14 in the body. Thus it is possible, by replacing the rollers 17 and 18 with rollers of different diameters, but such that the sum of the diameters of one roller 17 and one roller 18 remains constant, to impart to the thrust member 16 a slight axial displacement in relation to the thrust member 15.

Figure 4:
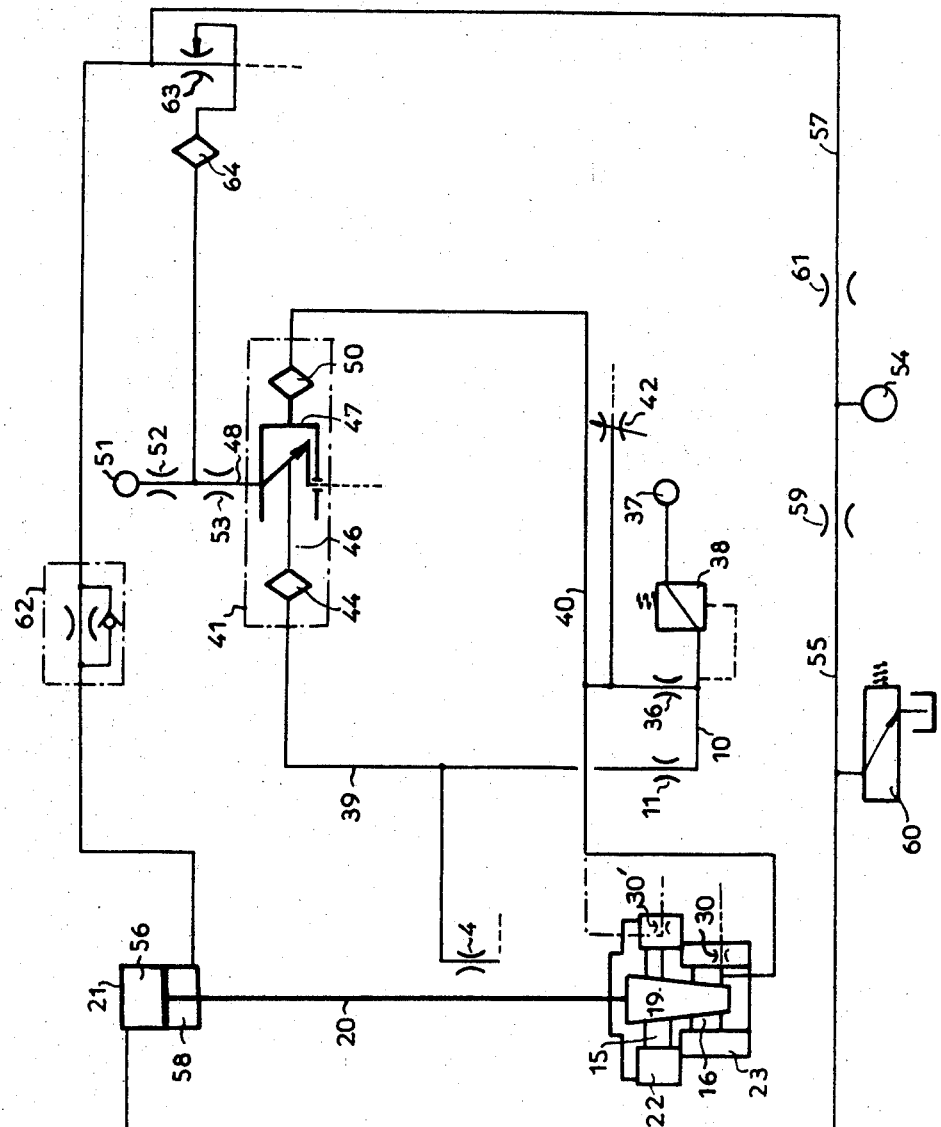
FIG. 4 is a diagram of hydraulic and pneumatic control circuits of the honing head.

The thrust members 15 and 16 are in contact with an expander cone 19, which is joined by an expander rod 20, to the piston of a double-acting hydraulic ram 21 (FIG. 4). The cone thus biases the thrust members 15 and 16 against split expanding collars 22 and 23, (honing members) which are faced externally with abrasive material. These collars 22 and 23 are secured to the honing body 12 by a nut 24, screwed on to the end of the body 12; washers 25 and intermediate rings 26 ensure the correct spacing of the collars 22 and 23.

The collars 22 and 23 enable two concentric bores 27 and 28 in the same workpiece 29 to be honed simultaneously.

Means is provided for detecting contact between the smaller-diameter expanding collar 23 and its bore 28. These means consist of a nozzle 30 of suitable size which forms a force fit in the body 12 and in a liner 31 secured to the collar 23. This nozzle 30 is in communication with the compressed air supply line 10 through one passage 32, in the body, another passage 33 in the intermediate member 13, a flexible hose 34, a passage 35 in the spindle 1, the rotary seal 9 and a flow regulator which consists, for example, of an orifice 36.

When the expanding collar 23 is in contact with its bore 28, the nozzle 10 is obstructed and the pressure downstream of the orifice 36 is at its maximum, this pressure is lower when contact is not established.

As can be seen from FIG. 4, the line 10 is supplied from a compressed air source 37 through a pressure regulating and reducing valve 38. The two orifices 11 and 36 are connected by pipes, 39 and 40, to a potentiometric pilot or sequence valve 41; the orifice 36 is also connected to a variable orifice 42; which opens into the atmosphere.

The valve 41 (FIG. 5) comprises a casing 43, within which a capsule 44 is secured by one of its diaphragms, the interior of the capsule being in communication with the pipe 39. The other diaphragm of this capsule 44 acts, in opposition to a restoring spring 45, on the slide 46 of a valve body 47, enabling a pipe 48, to be connected to exhaust through a flexible hose 49.

In addition, the valve body 47 has freedom to move within the casing 43 and is connected to one diaphragm of a second capsule 50, the other diaphragm of which is secured to an end cap of the casing 43. The interior of this capsule 50 communicates with the pipe 40. The pipe 48 is connected to a compressed air supply 51, through two orifices 52 and 53.

The ram 21 is controlled by a hydraulic circuit which includes a pump 54, supplying pressure to a circuit 55, communicating with the upper chamber 56 of the ram 21, and with another circuit 57, connected to the lower chamber 58 of that ram.

Starting from the pump 54, the circuit 55 includes a constriction 59, and a pressure regulator 60. The circuit 57 also includes a constriction 61, and a flow regulator 62; this circuit is also connected to a bleed orifice 63, controlled by a capsule 64, connected to the pipe 48 intermediate the two orifices 52 and 53.

During operation, the advance of the expansion rod 20 is determined by the pressure differential between the chambers 56 and 58 and hence, in fact, by the pressure in the chamber 58, since the pressure in the chamber 56 is kept constant by the regulator 60.

When the expanding collars 22 and 23 are not yet in contact with the bores 27 and 28, the pressure in the pipe 39 is at its maximum, whereas that in the pipe 40 is at its minimum; the valve 41 is so arranged that the pipe 48 is then blocked. The capsule 64 expands and holds the bleed orifice 63 open, in which position its diameter is greater than that of the orifice 61. Hence, not only can all the liquid supplied to the pipe 57 by the pump 54 return to the reservoir through the bleed orifice 63, but part of the liquid in the chamber 58 is able to escape through the orifice 63 after passing through the flow regulating orifice 62. The honing member is in an expansion phase, the rate of expansion being limited by the flow regulator 62.

Let it be assumed, to begin with, that only the collar 22, which has no contact detector, is making contact with its bore 27. That being so, the torque detector will maintain the honing torque at a constant value A. Because of the resistive torque, the pressure in the pipe 39 falls, so that the capsule 44 collapses, exerting tension on the slide 46, and the pilot valve 41 opens. The capsule 64 collapses, progressively closing the bleed orifice 63, so that the rate of expansion falls, becoming zero when the flow through the orifice 63, equals that of the orifice 61. The expansion of the honing member is thus governed by the resistive torque.

If, now, the collar 23 makes contact with its bore 28, the pressure in the pipe 40 will rise, so that the valve body 47 moves to the left as shown in FIG. 5. The valve 41 will then be opened when the collapse of the capsule 44 is more advanced, that is to say when the resistive torque is higher. The torque detector still keeps the honing torque constant, but at a higher value B.

If contact be established directly through the agency of the collar 23, the honing torque is immediately maintained at its maximum value B. If it is desired to avoid this, the collar 22 can be fitted with a contact detector, as shown in chain lines in FIG. 4, the orifice of that detector being indicated at 30'. The honing torque will then be maintained from the start at a constant value A or A', according to whether contact is established through the agency of the collar 22 or of the collar 23, rising to a value B when both collars are in contact with their bores.

In the modification shown in FIG. 5, the orifice 30 is in communication with the compressed air supply line 10 through a flow regulating orifice 65. It is also connected, downstream of this regulator 65, with a pressure contact 66, inserted in the energizing circuit of an electrically operated valve 67, normally open, which is connected to the pipe 40 through a flow regulator 68.

When the pressure between the flow regulator 65 and the nozzle 30 reaches a predetermined value, because of contact being established between the collar 23 and its bore 28, the pressure contact 66 closes the electrically operated valve 67, so that the pressure in the pipe 40 increases, the value of the honing torque being thereby increased as hereinbefore indicated. In an alternative, unillustrated embodiment the honing component has more than two expanding collars. All the collars, or at least some of them, would then be equipped with a nozzle similar to the nozzle 30, the diameter of that nozzle being adapted to the optimum applied torque for the collar concerned. Again, in another alternative the expansion rod 20 is operated by a hydraulic motor served through a servo-valve controlled by the pressure in the pipe 57, beyond the orifice 63, in a manner similar to that described in French Pat. specification No. 1,581,491.

What I claim is:

1. In a honing head
   at least two expandible honing members,
   mechanism for expanding the honing members simultaneously,
   a resistive torque detector,
   control means operative to actuate the said mechanism in dependence upon the resistive torque detected by the detector,
   a pneumatic device incorporated in one of the honing members and arranged to detect contact of the honing member with the corresponding bore, and
   means responsive to contact of the honing member whereby the resistive torque can be increased by a predetermined value depending on the particular honing member at which contact was detected.

2. A honing head according to claim 1, in which the pneumatic device comprises
   a nozzle connected to the corresponding honing member,
   a compressed air supply means, and
   a flow regulator connecting the air supply means and the nozzle.

3. A honing head according to claim 1, comprising
   a control circuit of the expanding mechanism, and
   a pilot valve in the control circuit, including
   a valve body, and
   a slide, movement of said valve body being controlled by the resistive torque detector and movement of the slide being controlled by the contact responsive means.

4. A honing head according to claim 3, comprising
   a first capsule, and
   a second capsule,
   said valve body and said slide being secured to one diaphragm of a respective said capsule.

5. A honing head according to claim 4, in which the interior of said first capsule is in communication with the torque detector.

6. A honing head according to claim 4, in which the interior of the second capsule is in communication with the contact responsive means.

7. A honing head according to claim 4, comprising
   a pressure contact,
   an electrically-operated valve controlled by the pressure contact,
   a compressed air supply means, and
   a circuit connecting the compressed air supply means and one of said capsules,
   said contact detecting means being in communication with said pressure contact and said pressure contact by-passing said circuit connecting the air supply means and one of the capsules.

* * * * *